C. CHILD & A. H. KEIR.
SCRAPER.
APPLICATION FILED MAY 21, 1914.
1,120,281.
Patented Dec. 8, 1914.
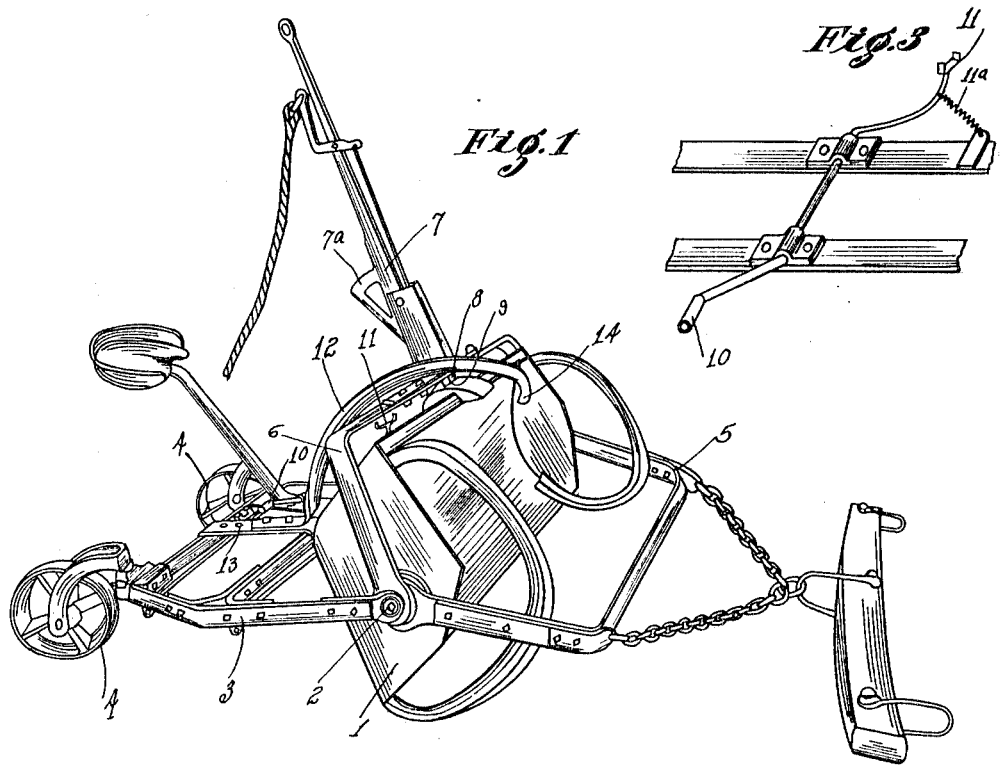
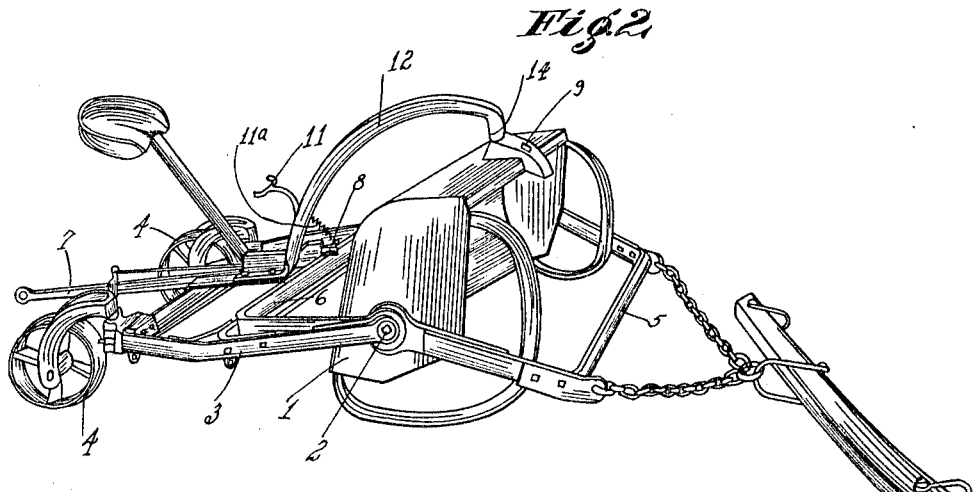
WITNESSES:
J. B. Webster
F. M. Blanchard
INVENTORS
Alexander H. Keir
Charles Child
BY
Percy S. Webster
ATTORNEY

UNITED STATES PATENT OFFICE.

CHARLES CHILD AND ALEXANDER H. KEIR, OF WALLACE, CALIFORNIA.

SCRAPER.

1,120,281.   Specification of Letters Patent.   Patented Dec. 8, 1914.

Application filed May 21, 1914. Serial No. 840,026.

*To all whom it may concern:*

Be it known that we, CHARLES CHILD and ALEXANDER H. KEIR, citizens of the United States, residing at Wallace, in the county of Calaveras and State of California, have invented certain new and useful Improvements in Scrapers; and we do declare the following to be a clear, full, and exact description of the same, reference being had to the accompanying drawings and to the characters of reference marked thereon, which form a part of this application.

This invention relates to improvements in scrapers used for scraping, excavating, leveling and other work of a similar character, the present invention embodying certain features of improvement over that structure shown in our pending application for patent, filed December 13th, 1913, Ser. No. 806,588.

The particular object of this present invention is to produce an automatic stop for the frame which co-acts with the scraper bowl when the same is used merely for leveling, all for the purpose of determining a fixed position of the rotatable scraper bowl so that it will perform the leveling operation with despatch and efficiency and certainty when the parts are positioned for the leveling operation alone.

A further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claims.

On the drawings, similar characters of reference indicate corresponding parts in the several views.

Figure 1 is a perspective view of the device showing the scraper bowl in one position. Fig. 2 is a similar view showing the scraper bowl in another position. Fig. 3 is a detached view of a pedal controlled operating lever.

Referring now more particularly to the characters of reference on the drawings, the numeral 1 designates the scraper bowl which has bearing pins 2 turnably mounted in a supporting frame 3 in such a manner as to normally allow the scraper bowl to make a complete rotation. Such frame 3 is mounted on rear supporting swiveled wheels 4.

The numeral 5 designates the drag frame suitably mounted on the pins 2.

The numeral 6 designates an independent frame turnably mounted on the pins 2 and extending around the rear of the bowl 1.

The numeral 7 designates a handle member on the frame 6 having a spring controlled latch 8 adapted to engage a catch 9 on the scraper bowl 1 when the frame 6 is to move with the scraper bowl 1.

The normal position of the handle 7 is substantially horizontal as shown in Fig. 2 and rests on the pedal shaped lever 10 adapted to be operated by the foot pedal 11 when said handle is to be lifted.

In practice, during the scraping operation, the latch 8 is normally engaged with the catch 9 so that the bowl 1 is held in horizontal position to scrape the earth with the forward movement of the device. When the bowl is filled with earth and it is desired to completely empty the same, the latch 8 is disengaged from the catch 9 and then with the continual forward movement of the device, the edge of the bowl engages the earth and acting as the load turns the bowl on its pivotal connection into inverted position when the earth is emptied therefrom and with the continued forward movement of the device the back of the bowl engages the earth as the load and revolves the same further to upright position, at which point the latch 8 again engages the catch 9. When only a portion of the load is to be emptied, then the latch 8 is allowed to continue in engagement with the catch 9 and the handle 7 is moved up and down to empty a portion of the load and then return the bowl to normal carrying position. When, however, the scraper bowl 1 is to be used for leveling, the latch 8 is engaged in the catch 9 and then to tilt the bowl 1 to vertical position ready for leveling, the handle 7 is thrown upwardly by the operation of the foot pedal 11 and the engagement of the edge of the scraper bowl against the ground combined with the forward movement of the bowl continues this tilting movement and as a matter of fact would tilt the same completely over to inverted position if we did not provide some means for limiting this movement and this limiting means is the main gist of this present invention and consists of an arm 12 adjustably secured to a bar 13 on the frame 3 and arching over the frame 6 and the bowl 1. On its outer end this arm 12 is provided with a stop 14 engageable by the frame 6 to limit the movement of the frame 6 and the bowl 1 when they are connected together by the catch 8. At this limit of movement the scraper bowl is in vertical position, which position is the most adaptable for leveling purposes. When the handle member 7 drops back to horizontal position, a beveled plate 7ª thereon strikes the pedal lever 10 and returns said pedal lever 10 to normal position in a gradual manner, the foot pedal 11 having a compression spring 11ª to compensate for the rebound of the same.

From the foregoing description it will readily be seen that we have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described our invention what we claim as new and useful and desire to secure by Letters Patent is:—

1. A device of the character described comprising the combination of a wheel mounted frame, a scraper bowl turnably mounted in said frame and capable of normally making a complete revolution therein, a frame pivotally mounted independently of said bowl, means for removably connecting said frame with said scraper bowl to cause the same to rotate therewith, and independent means mounted on said wheel mounted frame and engageable by said independent frame for limiting the rotation of said last named frame, as described.

2. A device of the character described comprising the combination of a wheel mounted frame, a scraper bowl turnably mounted in said frame and capable of normally making a complete revolution therein, a frame pivotally mounted independently of said bowl, means for removably connecting said frame with said scraper bowl to cause the same to rotate therewith, means for limiting the rotation of said frame, said last named means comprising an arm secured to said wheel mounted frame and projecting over said independently mounted frame and said scraper bowl, and a stop on said arm engageable by said independently mounted frame, as described.

In testimony whereof we affix our signatures in presence of two witnesses.

CHARLES CHILD.
ALEXANDER H. KEIR.

Witnesses:
J. B. WEBSTER,
FLOYD M. BLANCHARD.

Copies of this patent may be obtained for five cents each, by addressing the "Commissioner of Patents, Washington, D. C."